May 24, 1932. H. P. SACHSE 1,859,604
TRIP SCALE
Filed Sept. 8, 1930 2 Sheets-Sheet 1
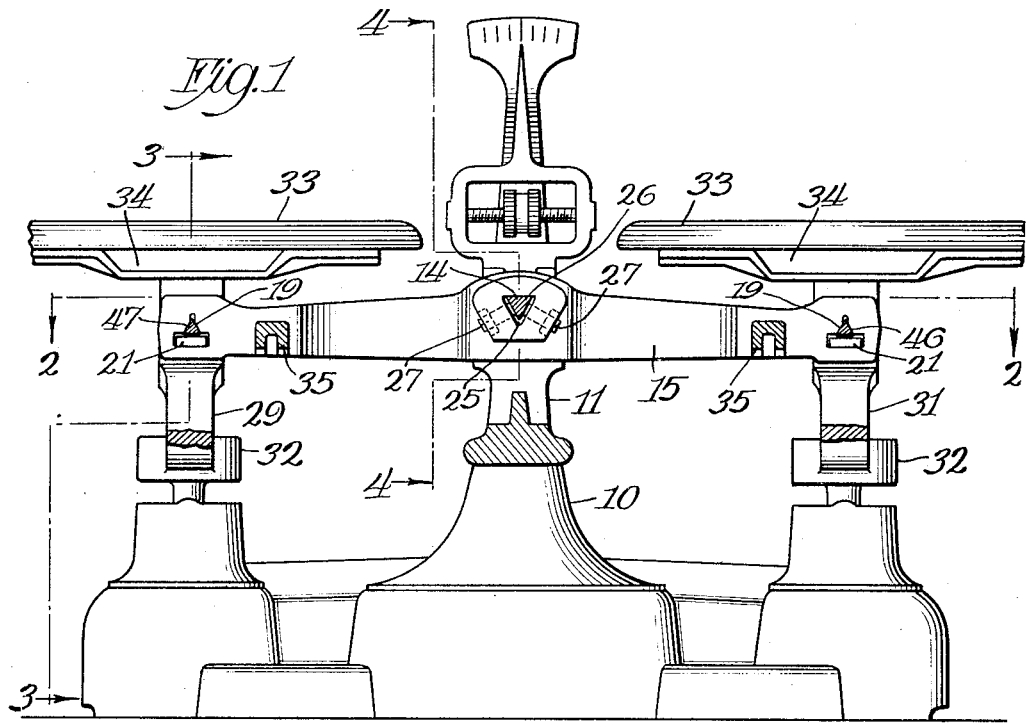
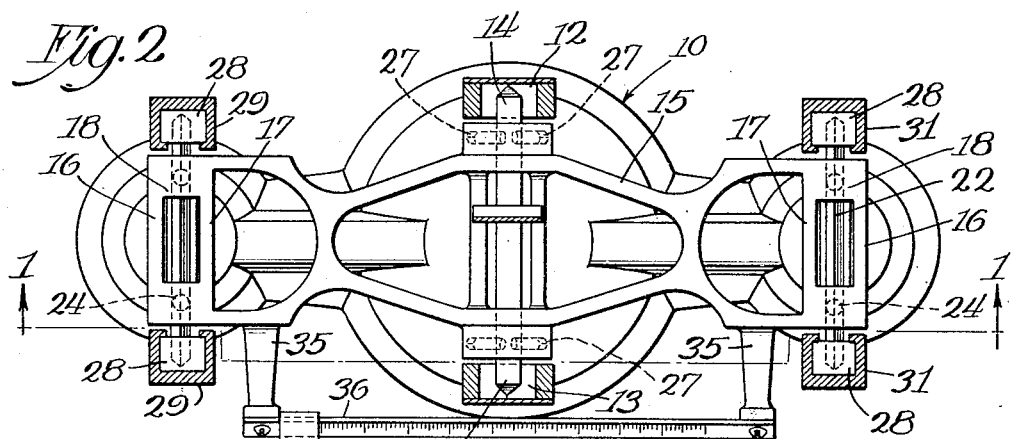
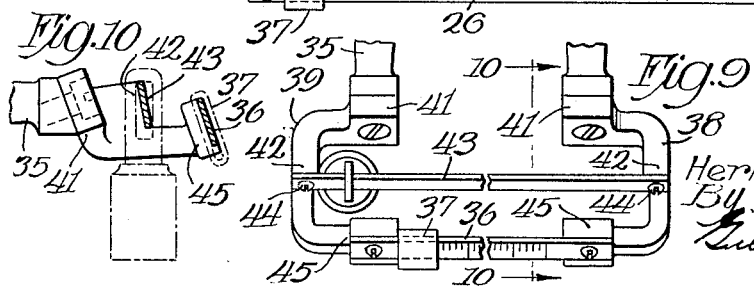
Inventor
Herman Paul Sachse
By
Gillson, Mann
Attys.

May 24, 1932. H. P. SACHSE 1,859,604
TRIP SCALE
Filed Sept. 8, 1930 2 Sheets-Sheet 2
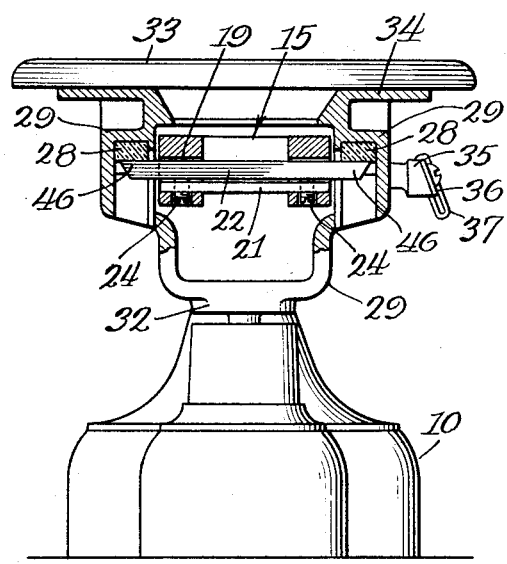
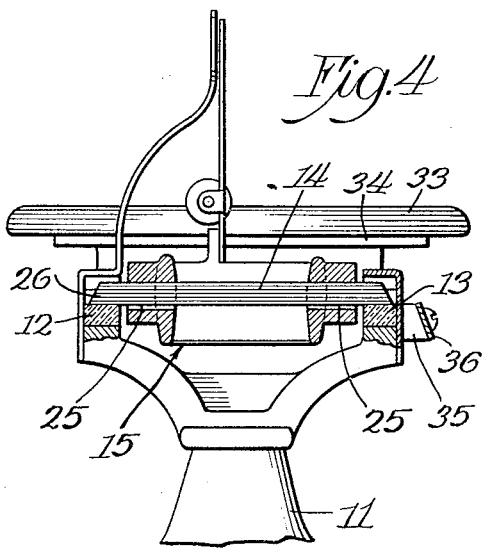
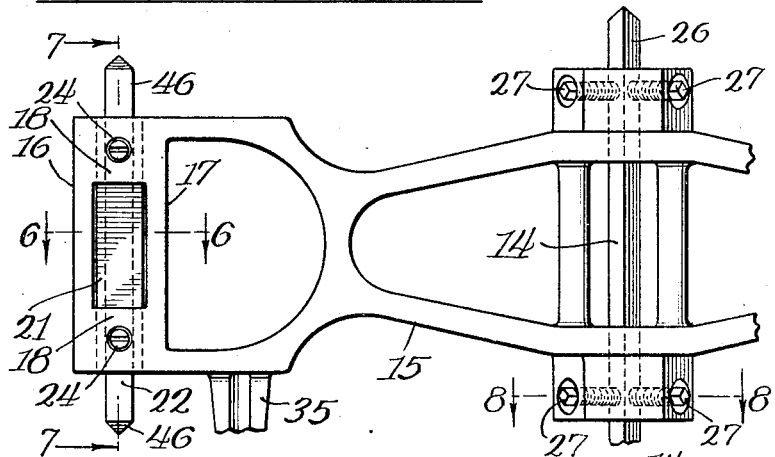
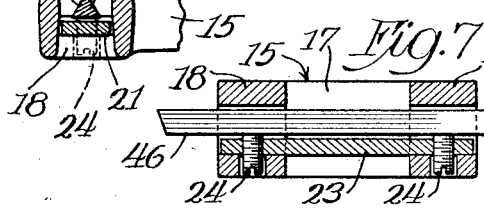
Inventor
Herman Paul Sachse Patented May 24, 1932

1,859,604

UNITED STATES PATENT OFFICE

HERMAN PAUL SACHSE, OF CHICAGO, ILLINOIS, ASSIGNOR TO CENTRAL SCIENTIFIC COMPANY, OF CHICAGO, ILLINOIS, A CORPORATION OF ILLINOIS

TRIP SCALE

Application filed September 8, 1930. Serial No. 480,298.

This invention relates to weighing scales and particularly to the type known as a trip scale which is characterized by a beam bearing three knife edge pivots, one at either end on which the pans are hung and one main pivot in the center. Since such scales find their main use in scientific laboratories and colleges, it is essential that the accuracy of the scale be constant and its sensitivity be high. This is only accomplished when the two end knives are maintained parallel to each other and the length of the beam does not change.

In order that the knives may be rigid and permanently fixed in the beam, it previously has been customary to cast the beam around a triangular steel knife which already is hardened, tempered and ground. It, therefore, becomes necessary to use as the alloy in the beam some metal which will melt at temperatures that will not destroy the temper of the knives. The metal most commonly used for such beams is zinc base die casting alloy, which is open to very serious objections, however. With the lapse of time, it creeps, that is, the crystal structure in the beam changes to such an extent that the metal actually changes its physical dimensions When this occurs, the high accuracy of the scale is destroyed. A lesser annoyance is that the metal "sweats" which makes it impossible to retain paint or protective enamel upon its surface. When the scale is exposed to corrosive vapors in laboratory use, the zinc base beam, since it cannot be protected, is attacked and corroded.

The object of this invention is to avoid the difficulties previously enumerated; to produce a beam in which the knives may be maintained parallel to each other within a high degree of accuracy; to use as the material for the beam alloys or metals which have a permanent crystal structure; to use a material having far more strength and rigidity than that previously possible; to increase the capacity of the scale; and to provide means for compensating for the slight lack of parallelism between the knives, which is due to the inescapeable tolerances existing in the manufacturing operation.

The methods by which I accomplish these results will become apparent from the specification when read in conjunction with the annexed drawings, in which Fig. 1 is an elevation of the scale with some parts shown in section, as indicated by the lines 1—1 in Fig. 2;

Fig. 2 is a top view of the scale from below the line 2—2 indicated on Fig. 1;

Fig. 3 is an end elevation partially in section, as indicated by the line 3—3 on Fig. 1;

Fig. 4 is an elevation and section through the central part of the scale as indicated by the line 4—4 of Fig. 1;

Fig. 5 is a bottom view of the major portion of the beam;

Fig. 6 is a transverse section through one end of the beam, as shown by the line 6—6 on Fig. 5;

Fig. 7 is a longitudinal section through one end of the beam taken on the line 7—7 of Fig. 5;

Fig. 8 is a vertical section through the central portion of the beam and central pivot knife, on the line 8—8 of Fig. 5;

Fig. 9 illustrates a modification of the beam and an extension bracket which may be applied when it is desired to use riders capable of both coarse and fine weighing; and Fig. 10 is an end view of the modification of Fig. 9 looking from the line 10—10 of Fig. 9. The position of the riders when run out to their maximum weighing capacity is indicated by the dotted lines.

In Fig. 1, the scale comprises a base 10 bearing a U-shaped bracket 11 which carries the bearing planes 12 and 13 at its extremities. The planes are preferably polished agates and are set into the ends of the bracket by cement or other suitable means. Balanced upon the planes by means of a triangular knife edge pivot 14 is a beam 15 which I make, preferably, from some strong metal or alloy. It is desirable to make the beam as light as possible, and, consequently, I prefer to die cast the beam from some of the so-called "strong" aluminum alloys, although the beam may be cast in the regular manner from aluminum, brass, bronze or the like.

With reference to Fig. 5, it will be seen that the beam is provided at either end with a transverse terminus composed of two flange sections 16 and 17 and a web section 18. A transverse slot is in the web and extends parallel to the axis of the beam, the top of the slot (Fig. 6) having a V-section 19 which merges with a longitudinally extending rectangular section 21. The pivot bar 22, which is hereafter called a knife, is seated in the V-shaped portion of the slot and is locked in position by a retaining strip 23 which is held in place by set screws 24. The central portion of the beam is pierced with a transverse bore 25, as best illustrated in Fig. 8, which allows the central and main support knife 26 to be seated upon its upper face, but gives clearance for the knife on its other two faces. The knife is locked into position within the bore 25 by means of the set screws 27 normal to the lower inclined faces of the knife. These preferably are arranged with square or irregularly shaped heads and are not slotted, since an adjustment once made is not supposed to be disturbed.

Following the usual construction of trip scales, the pans are hung from the agate planes 28, 28, maintained in the yokes 29 and 31. Preferably the yokes carry shot trays 32, 32 so that the device may be accurately balanced. The lower end of the yoke terminates in an extension, not indicated, which is fastened to a cross link, also not indicated, pivoted to the opposite extension. Strict parallelism of the yokes is, therefore, assured.

As is usual in such scales, the pans 33, 33 are of porcelain or glass held in pressed metal retainers 34, 34.

In Fig. 2, it will be seen that adjacent either end the beam carries an arm 35 extending outwardly parallel to the knives. A graduated slide bar 36 which bears the rider 37 is screwed to the terminus of the arms. It is frequently desirable to eliminate the need of the separate weights; consequently in some models, a second bar is provided on which a heavy rider slides, as indicated in Figs. 9 and 10. It is the preferred construction that this latter rider shall be nearer the point of support in order that the component of rotation which it introduces may be as small as possible. The gross weighing bar is, therefore, the inside bar.

Dies to make such a beam are quite expensive, particularly so since the tolerances are necessarily much less than usual commercial practice allows. It, therefore, is desirable that the beam 15 be adaptable for use either in a single or a two-slide bar scale.

Consequently, I provide brackets 38 and 39 illustrated in Figs. 9 and 10. One end of the bracket terminates in a pad 41 formed at a proper angle to mate with the bevel end of the arms 35. Midway in the extent of the brackets is a further pad 42, 42 against which the coarse weighing bar 43 is held by the screws 44. The configuration of the outer ends 45 of the brackets is identical with that of the configuration of the ends of the arm 35 so that the same fine weighing bar 36 may be used in both instances. It is understood that the brackets 38 and 39 are not identical, but are geometrically similar.

The parallelism of the slots 19 at either end of the beam is made as close as is possible and, therefore, the trunnions 46, 47 formed by the knife should be equally distant from the central knife 14. Mechanically, however, it is usually impossible that this combination is attained.

It must be remembered that this scale has a sensitivity of about 1/50,000 of its maximum weighing capacity and that though this lack of parallelism is almost immeasurably small when mechanically measured, the error can be found by the behavior of the beam. To compensate for this error, the beam itself, without the pans, yokes and appurtenances is balanced upon a set of planes corresponding to the planes 12 and 13. Calibrating weights which are exactly equal are hung from the knife trunnions 46 and 47. The beam is then balanced.

The weights are removed and hung from like trunnions on the opposite side of the beam 15. If the beam tilts, it indicates that one arm of the beam is longer than the other. In such a case, screws 27 are turned until the knife 14 assumes a position which splits the linear error of the knife edge trunnions. When the weights can be interchanged without in any way deflecting the beam, this adjustment is correct.

It is thus apparent that I have produced a beam which may be cast from materials too refractory to be cast around the tempered guides and, therefore, make a stronger scale free from creeping of the beam. It is also clear that the slots 19 may be maintained parallel to a high degree of accuracy and that the knives may be easily inserted and locked in the beam without the danger of displacement.

What I claim, therefore, is:

1. A trip scale beam having a V-shaped transverse slot adjacent either end, a V-shaped knife in each slot bearing against the correspondingly shaped walls of the slot, means for locking the two knives into position, and a third knife passing through an aperture in the beam and centrally located with respect to the terminal knives.

2. A trip scale beam having a transverse V-shaped slot parallel to the axis of the beam and spaced therefrom, a knife in the slot and projecting beyond the beam, said projections forming knife edge trunnions for the pan bearings, and means engaging the knife and the beam to lock the knife within the slot.

3. A trip scale beam having a transverse

V-shaped slot parallel to the axis of the beam adjacent either end thereof, a knife in the slot projecting beyond the beam, said projections forming knife edge trunnions for the pan bearings, means engaging the knife and beam to lock the knife within the slot, a knife centrally located with respect to the terminal knives forming a pivot for the beam, and means to cause the central knife to assume a position other than parallel to the axis of the beam to compensate for errors in parallelism between the two terminal knives.

4. A scale beam having an irregularly shaped hole pierced transversely through the beam adjacent the ends, said hole comprising a V-shaped cross section and a rectangular cross section, one margin of which rectangular cross section merges with one margin of the V-slot.

5. A scale beam having a slot formed to receive a knife and a second slot formed to receive a retainer, and means including a retainer for adjustably maintaining the knife within the slot.

6. A scale beam having a transverse slot spaced from and parallel to the axis of the beam, a knife seated within the slot, a retaining strip bearing against the exposed face of the knife, and means for locking the retaining strip against the knife.

7. A scale beam having transverse apertures parallel to the axis of the beam and spaced equally therefrom, bearing knives removably clamped within the said apertures, a removable pivot knife at the axis of the beam, adjustable means for clamping the pivot knife to the beam whereby the pivot knife may be positioned other than coincident with the axis of the beam to compensate for lack of parallelism between the end knives.

8. In a trip scale of the type including a scale beam equipped with a pivot knife and two end knives equally spaced from and parallel to the pivot knife, the combination therewith of arms projecting laterally from the beam normally adapted to carry a rider bar, and brackets rigidly secured to the arms having pads thereon for receiving a plurality of rider bars, said rider bars extending equally in opposite directions from the axis of the beam.

In testimony whereof I affix my signature.

HERMAN PAUL SACHSE.